United States Patent [19]

Comparetto

[11] 4,383,348
[45] May 17, 1983

[54] DEVICE FOR OPENING SHELLFISH

[76] Inventor: John E. Comparetto, P.O. Box 433, Nassawadox, Va. 23413

[21] Appl. No.: 313,391

[22] Filed: Oct. 21, 1981

Related U.S. Application Data

[62] Division of Ser. No. 955,549, Oct. 27, 1978, Pat. No. 4,313,241.

[51] Int. Cl.³ .................................................. A22C 29/04
[52] U.S. Cl. .................................................. 17/74
[58] Field of Search .............. 17/48, 51, 74; 220/211, 220/230

[56] References Cited

U.S. PATENT DOCUMENTS

| | | | |
|---|---|---|---|
| 2,530,783 | 11/1950 | Pogany | 17/48 |
| 2,978,334 | 4/1961 | Lapeyre | 17/48 X |
| 3,456,836 | 7/1969 | Erickson et al. | 220/211 |
| 3,471,894 | 10/1969 | Tasker | 17/48 |
| 3,487,421 | 12/1969 | Ruppel et al. | 53/525 X |
| 4,030,322 | 6/1977 | Pettit | 220/211 X |
| 4,124,920 | 11/1978 | Wenstrom et al. | 17/48 |

Primary Examiner—Willie G. Abercrombie

[57] ABSTRACT

Shellfish are placed into a chamber which is brought rapidly to a high pressure. A lid of the chamber is magnetically sealed. The magnets are quickly released to allow the chamber pressure to blow off the cover with large springs absorbing energy. The immediate decompression causes the shellfish to open. A sonic or ultrasonic source within the chamber augments the process.

8 Claims, 2 Drawing Figures

DEVICE FOR OPENING SHELLFISH

This application is a division of application Ser. No. 955,549, filed Oct. 27, 1978, now U.S. Pat. No. 4,313,241.

BACKGROUND OF THE INVENTION

The present methods of opening shellfish are numerous. Most successful has been flash heating with steam or flame, which subjects shellfish momentarily to heat. Each shellfish has a critical temperature range within which the creature dies and releases its shell. More recently, combinations of steam and pressure have been used so that lower temperatures could possibly be used. Other methods include manual shucking, methods for fracturing the shell, and chemical solutions into which the shells are placed. All the above have inherent drawbacks too numerous and varied to comment on.

OBJECTS OF THE INVENTION

An object of the invention is to open the shell without grossly fracturing the shell and macerating its content.

A further object of the invention is to open the shell without bleeding of the juices inherent in the flash methods.

A further object of the invention is to do the above in an unlimited quantity depending on the size of the device.

A further object of the invention is to do same with a heterogenous group of shells as to shell size.

A further object of the invention is to provide a less expensive system than the highly complicated machinery now in use.

A further object of the invention is to use an ultrasonic transducer to facilitate opening and/or the passage of surrounding medium into the shellfish.

A further object of the invention is to provide a vibrator for facilitating opening and/or the passage of the surrounding medium into the shellfish.

A still further object of the invention is to have a hyperbaric chamber capable of using gases such as nitrogen to enhance the animals release from the shell.

DETAILED DESCRIPTION OF THE INVENTION

Figure 1:
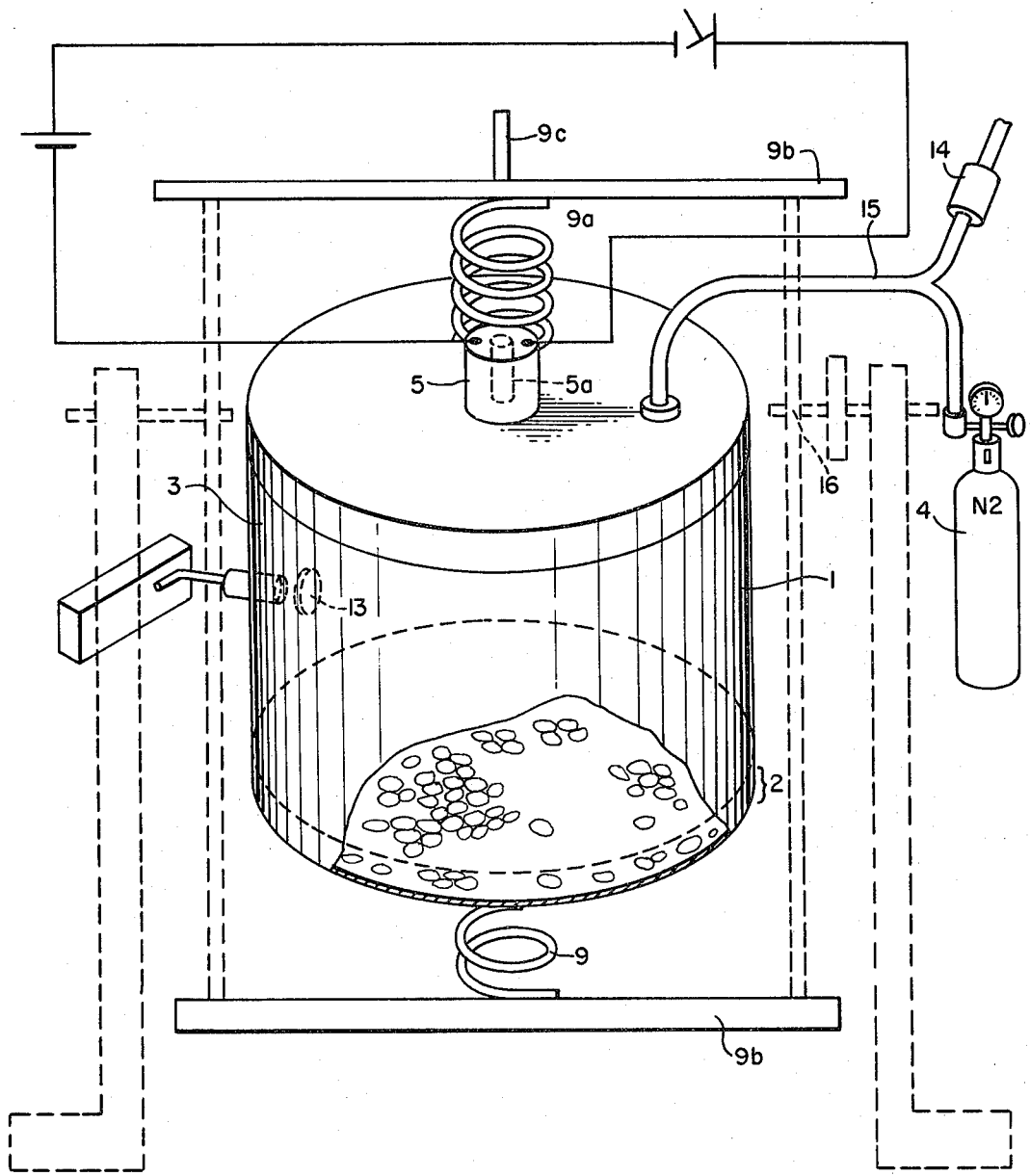
FIG. 1 shows a schematic view of the invention.
Figure 2:
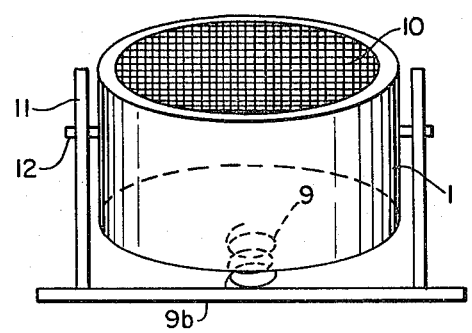
FIG. 2 shows a schematic detail of the chamber, screen shield, and guide arms.

FIG. 1 shows a chamber 1 made of stainless steel or other suitable material into which shellfish, for example, oysters 2 are placed. FIG. 1, 3 shows area of chamber into which gas under high pressure is introduced by pump or high pressure gas source 4. Electromagnet or permanent release magnet 5; magnetic core 5A attached to bottom sealing plate which is the magnetized lid of chamber 1. Current source 7, completed by switch 8. FIG. 1, 9 shows a heavy duty spring for the downward recoil of the chamber. FIG. 1, 9A shows a heavy duty spring attached with adjustable sleeve or bracket 9C to allow for lid opening. The heavy duty spring is to allow for the upward recoiling of the magnetized lid. Framework 9B comprises heavy structured steel frame to attach springs or other shock absorber 9 and 9A. FIG. 2 shows chamber 1 with screen lid 10. Guide arms 11 supports chamber connections 12. Sonic or ultrasonic head source 13 is mounted within chamber 1.

The process consists of introducing pressure in an enclosed chamber not to exceed the fracture point of the shells but enough to compress the shells a minute amount, for example, 0.001 of an inch. Sudden release of this pressure should tend to open the shells. This sudden release is accomplished by a magnetized lid, most preferrably, magnetized electrically 5. With the release of electromagnet 5 the hyperbaric pressures within the chamber are instantly released. It might be necessary to utilize heavy duty springs 9 and 9A to absorb energy from the sudden release of compressed gas. After sudden releasing, the current could be reapplied to the magnet re-sealing chamber for either a repeat of hyperbaric conditions or evacuation of the gas to form a vacuum over the shells with vacuum pump 14 on feed tubing 15.

While the shells could be placed under water or other liquid within the chamber, the best method might be the utilization of a gas or a liquid that would cause a physiologic change in the animal. This physiological reaction would be predicated on the permeation of the gas through the seams of the shell.

The gas or liquid should not poison the meat. A gas of choice might be nitrogen. It is known that the deep sea clam experiences "the bends" when the animal is quickly raised from the depths. Utilizing a hyperbaric chamber as described herein, nitrogen gas can be caused to permeate the seams of the shell and the tissue within. The combination of sudden change of pressure and hyperbaric nitrogen should be an efficient method of opening difficult shells such as the oyster. The process of increasing pressure and then suddenly releasing could be repeated if necessary.

The induction of nitrogen narcosis in shellfish would be subject to variance of time and the amount of pressure.

The permeation of the nitrogen or other surrounding medium could be further enhanced by the generation of sonic waves, ultrasonic waves, or a gross mechanical vibration 13, FIG. 1. Combinations of these energies within a hyperbaric atmosphere might be required, however, this might indeed be an "overkill" that would cause problems such as bleeding as seen in flash methods.

The sudden escaping of gas under pressure would become more violent as pressure is increased, therefore, the limiting parameter would be the too violent sudden escape of gas. Chamber 1 would be affixed with barrier screen 10 to prevent unwanted expulsion of chamber contents. Guide arm 11 would allow for movement to be absorbed by the centrally located springs 9 and 9A affixed to framework 9B. Pivot arm FIG. 1, 16 on one or both sides of vertical frame member 9D allows for dumping of contents.

The gas might be evacuated rapidly from a valve with sufficient speed to cause nitrogen narcosis after hyperbaric levels had been attained. The device should allow for the subjection of the freshly opened shells to liquid nitrogen for freezing. The product could now be packaged for selling with opened shell included, however, this might prove an unwanted weight factor in shipping.

What is claimed is:

1. A shellfish opening device comprising a hyperbaric pressure chamber, means for holding shellfish in the chamber, an energy transducer source within the chamber, for passing energy waves through fluid surrounding the shellfish in the chamber, means for subjecting the chamber to hyperbaric pressures, means for rapidly releasing the hyperbaric pressure from the chamber whereby shellfish open in the chamber, wherein the pressure releasing means comprises a lid closing the chamber and magnet positioned adjacent the lid for holding the lid and chamber closed.

2. The apparatus of claim 1 wherein the magnet consists of an electromagnet.

3. The apparatus of claim 1 wherein the magnet consists of a permanent release magnet.

4. The device of claim 1 further comprising an ultrasonic transducer source within the chamber.

5. The device of claim 1 further comprising a sonic energy source within the chamber.

6. The device of claim 1 further comprising a vibratory apparatus within or adjacent to the chamber for vibrating the chamber and/or its contents.

7. The device of claim 1 further comprising a first spring connected to the chamber and second spring means connected to the lid and a frame means connected to the first and second springs for holding the chamber and lid in place for use, the first and second springs absorb the recoiling of the chamber and lid upon release of pressure.

8. A shellfish opening device comprising a hyperbaric pressure chamber, the chamber having an opening, a lid which fits the opening, the lid fitting the opening of the chamber so as to form a complete seal, a first magnetic attachment means located upon the chamber near the opening and a second magnetic attachment means located upon the lid, the first and second magnetic attachment means forming a latching device to hold the lid in the opening of the chamber, the latching device having a release so as to allow for the disattachment and reattachment of the lid to the opening of the chamber, a means for holding shellfish within the chamber, a means for introducing gaseous or fluid material into the chamber to create a hyperbaric condition, an energy transducer source within the chamber, for passing energy waves through the chamber so as to induce the shellfish upon the holding means within the chamber to open, a first spring attached to the bottom of the chamber, a second spring attached to the lid, the first and second springs being connected to a frame means which supports the chamber, guide arm having a first end attached to a side of the chamber and a second end attached to the frame means so as to provide additional support for the chamber, a means for rapidly decompressing the chamber when subject to hyperbaric pressure, and the first and second springs and the frame means absorb recoil of the chamber and the lid during rapid decompression.

* * * * *